Patented Apr. 21, 1931

1,801,901

UNITED STATES PATENT OFFICE

EDGAR C. BRITTON AND HAROLD R. SLAGH, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING PHENOL ETHYL ETHERS

No Drawing. Application filed August 26, 1927. Serial No. 215,754.

Customarily phenol ethyl ethers are prepared by reacting between the sodium or potassium salt of the phenol and ethyl bromide in alcoholic solution. The use of the alcohol has been supposed to be essential, notwithstanding the difficulties incurred in its handling and recovery, these involving serious fire and explosion hazards and requiring considerable special equipment and labor. The avoidance of such hazards, and the elimination of special auxiliary distillation and rectifier equipment is accordingly highly desirable.

To the accomplishment of the foregoing and related ends, the invention, then, consists of the features hereinafter fully described, and particularly pointed out in the claims, the following description setting forth in detail certain features embodying the invention, the examples being illustrative however of but a few of the various ways in which the principle of the invention may be employed.

In proceeding in accordance with our invention, a phenol in combination with a base, preferably as an alkali metal phenate, is subjected to the action of an ethyl halide, in water. The presence of the water molecule, instead of being detrimental, is with suitable conditions of temperature, and pressure where necessary, in fact conducive to efficient action and high yields.

As an illustrative example: 15 parts by weight of phenol are treated with 6-9/16ths parts by weight of caustic soda dissolved in 19-1/2 parts by weight of water, this then forming substantially a 50% solution of sodium phenate. This solution, in a pressure reaction vessel or autoclave capable of withstanding material pressure, is treated with 10-6/16 parts by weight of ethyl chloride. The latter may be added under pressure, or the sodium phenate may be cooled down and the ethyl chloride may then be added in liquefied form if preferred. The mixture is then heated to 90–120° C., with stirring, and is maintained at this temperature for about 8 hours. Any excess ethyl chloride may be then distilled off and recovered, and by steam distillation then, the phenetole product may be taken off. The reaction occurring may be represented as follows:

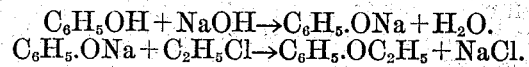

As another illustration: 15 parts by weight of benzo-azo-phenol are treated with 2-13/16ths parts by weight of caustic soda and 17 parts by weight of water. In a pressure reaction vessel or autoclave, this is now reacted with 4-10/16ths parts by weight of ethyl chloride, being heated at about 105° C. for about 8 hours. A yield of about 95% of benzo-azo-phenetole is obtained. The reaction may be represented as follows:

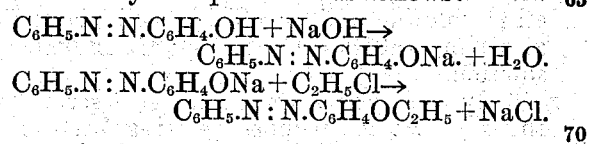

In a similar manner, with the reagents in water and using ethyl chloride preferably, although the other halides may be employed if desired, phenetole may be prepared from phenol, phenetidine from p-amino phenol, p-ethoxy diphenyl from hydroxy diphenyl, hydroquinone di-ethyl ether from hydroquinone, o-cresol ethyl ether from o-cresol, p-nitro phenetole from p-nitro phenol, p-chlorphenetole from p-chlorphenol, and B-naphthol ethyl ether from B-naphthol. The presence of a base in combination with the phenol generally for allowing reaction with the halide may be of a comprehensive character including the more readily available bases, but preferably sodium or potassium.

The temperatures to be employed will in general run between 50 and 150° C., varying with the particular agents being treated, and the pressures in any instance will be such as sufficient to hold the more volatile components at the temperature employed.

It will thus be seen that compounds of this character may be readily prepared, in a manner free from the hazards of highly inflammable and explosive agents, and withal to the production of superior yields. At the same time, pressures required are less than in the prior practice where alcohol was present. The yields are excellent, even better than with the presence of alcohol, and the working up of the reaction products is rendered simple.

Other modes of applying the principle of the invention may be employed, change being made as regards the details disclosed, provided the means stated in any of the following claims, or the equivalent of such, be employed.

We therefore particularly point out and distinctly claim as our invention:—

1. In a process of the character described, the step which includes reacting between an ethyl halide and an alkali metal phenate in water solution.

2. In a process of the character described, the step which includes reacting between an ethyl halide and an alkali metal phenate at a temperature of 50 to 150° C., in water solution.

3. In a process of the character described, the step which includes reacting between an ethyl halide and an alkali metal phenate under pressure, in water solution.

4. In a process of the character described, the step which includes reacting between ethyl chloride and an alkali metal phenate, in water solution.

5. In a process of the character described, the step which includes reacting between ethyl chloride and an alkali metal phenate at a temperature of 50 to 150° C., in water solution.

6. In a process of the character described, the step which includes reacting between ethyl chloride and an alkali metal phenate under pressure, in water solution.

7. In a process of the character described, the step which includes reacting between an alkali metal benzo-azo phenate and an ethyl halide, in water solution.

8. In a process of the character described, the step which includes reacting between an alkali metal benzo-azo phenate and an ethyl halide at a temperature of 50 to 150° C., in water solution.

9. In a process of the character described, the step which includes reacting between an aqueous solution of an alkali metal benzo-azo phenate and an ethyl halide under pressure at a temperature of 50 to 150° C.

10. In a process of the character described, the step which includes reacting between an alkali metal benzo-azo phenate in water solution and ethyl chloride.

11. In a process of the character described, the step which includes reacting between a benzo-azo phenate in water solution and ethyl chloride under pressure.

12. In a process of the character described, the step which includes reacting between benzo-azo phenate in water solution and ethyl chloride at a temperature of about 105° C. under pressure.

Signed by us this 22d day of August, 1927.

EDGAR C. BRITTON.
HAROLD R. SLAGH.